(12) United States Patent
Hasegawa

(10) Patent No.: US 8,967,113 B2
(45) Date of Patent: Mar. 3, 2015

(54) VACUUM PUMP MOUNTING STRUCTURE

(71) Applicant: Suzuki Motor Corporation, Hamamatsu, Shizuoka (JP)

(72) Inventor: Hirokazu Hasegawa, Shizuoka (JP)

(73) Assignee: Suzuki Motor Corporation, Hamamatsu-Shi (JP)

( * ) Notice: Subject to any disclaimer, the term of this patent is extended or adjusted under 35 U.S.C. 154(b) by 0 days.

(21) Appl. No.: 14/163,810

(22) Filed: Jan. 24, 2014

(65) Prior Publication Data

US 2014/0219831 A1 Aug. 7, 2014

(30) Foreign Application Priority Data

Feb. 1, 2013 (JP) .................................. 2013-018110

(51) Int. Cl.
| | | |
|---|---|---|
| F02B 41/00 | (2006.01) | |
| F04D 29/60 | (2006.01) | |
| B60T 17/02 | (2006.01) | |
| F01C 21/10 | (2006.01) | |
| F04C 25/02 | (2006.01) | |
| F04C 29/00 | (2006.01) | |
| F02B 67/06 | (2006.01) | |
| F04C 18/344 | (2006.01) | |
| F01L 1/02 | (2006.01) | |

(52) U.S. Cl.
CPC .................. *F04D 29/60* (2013.01); *B60T 17/02* (2013.01); *F01C 21/10* (2013.01); *F04C 25/02* (2013.01); *F04C 29/0085* (2013.01); *F02B 67/06* (2013.01); *F04C 18/344* (2013.01); *F01L 1/02* (2013.01)

USPC ..................................... 123/198 C; 123/90.38

(58) Field of Classification Search
CPC ........ F04D 29/60; F02B 67/04; F02F 7/0068; F02F 7/008
USPC ....... 123/90.38, 198 C, 198 E, 195 A, 195 C, 123/196 R, 193.5
See application file for complete search history.

(56) References Cited

U.S. PATENT DOCUMENTS

| | | | | |
|---|---|---|---|---|
| 4,458,641 | A * | 7/1984 | Wickramasuriya | ....... 123/195 A |
| 5,839,401 | A * | 11/1998 | Gruber et al. | ............. 123/90.31 |
| 7,665,435 | B2 * | 2/2010 | Imazato et al. | ............ 123/90.27 |
| 8,061,317 | B2 * | 11/2011 | Bohner et al. | ............. 123/90.17 |
| 2008/0196522 | A1 * | 8/2008 | Eberhardt et al. | ................ 74/63 |

FOREIGN PATENT DOCUMENTS

JP 2009-085119 A 4/2009

* cited by examiner

*Primary Examiner* — Hung Q Nguyen
(74) *Attorney, Agent, or Firm* — Stein IP, LLC

(57) ABSTRACT

There is provided a vacuum pump mounting structure. A vacuum pump is connected to an axial end portion of a first cam shaft of an engine and is configured to be driven by the first cam shaft. The first cam shaft is disposed in a cylinder head. A cam housing rotatably supports the first cam shaft on the cylinder head. A cam housing-side boss portion and a cylinder head-side boss portion are formed in the cam housing. An engine-upper side of a body portion of the vacuum pump is fixed to the cam housing-side boss portion. An engine-lower side of the body portion of the vacuum pump is fixed to the cylinder head-side boss portion.

2 Claims, 10 Drawing Sheets

US 8,967,113 B2

VACUUM PUMP MOUNTING STRUCTURE

CROSS-REFERENCE TO RELATED APPLICATIONS

This application claims the benefit of Japanese Application No. 2013-018110, filed Feb. 1, 2013 in the Japanese Patent Office. All disclosures of the document(s) named above are incorporated herein by reference.

BACKGROUND OF THE INVENTION

1. Field of the Invention

The present invention relates to a vacuum pump mounting structure for mounting a vacuum pump for use in a vehicle, and, more specifically, to a vacuum pump mounting structure in which a vacuum pump is connected to an axial end portion of a cam shaft of an engine and is configured to be driven by the cam shaft.

2. Description of the Related Art

A vacuum pump has a function of generating a negative pressure with rotation driving force, and the negative pressure is used for engine negative pressure driving parts such as a negative pressure booster device of a brake, and a VSV (Vacuum Switching Valve) for controlling a turbo charger. Recently, a cam shaft is typically used as a rotation driving source of such a vacuum pump. That is, the vacuum pump is connected to the cam shaft, and is driven by the cam shaft. A vacuum pump mounting structure for such a vacuum pump is disclosed in Patent Document 1, for example. In the vacuum pump mounting structure disclosed in Patent Document 1, a timing gear is attached to an axial end portion of the cam shaft, and a timing chain is wound around the timing gear to transmit rotation of a crankshaft of the engine. The timing chain is covered by a cover. The vacuum pump is connected to the cam shaft, but a body of the vacuum pump is attached to the cover covering the timing chain.

Patent Document 1: Japanese Patent Application Publication No. 2009-085119 A

The cam shaft is supported by a cylinder head with a cam housing. For example, the cam housing is attached to the cylinder head so that the cam shaft is pushed toward the cylinder head side against a reaction force of a lash adjuster. The cam housing may be floated by a force from the cam shaft, which leads to vibration and noise. Since the body of the vacuum pump is simply attached to the cover in the vacuum pump mounting structure according to the related art, it is not possible to suppress the vibration and the noise.

SUMMARY OF THE INVENTION

It is therefore an object of the present invention to provide a vacuum pump mounting structure which can suppress vibration and noise of an engine.

In order to achieve the above object, according to an aspect of the embodiments of the present invention, there is provided a vacuum pump mounting structure in which a vacuum pump is connected to an axial end portion of a first cam shaft of an engine and is configured to be driven by the first cam shaft, the vacuum pump mounting structure comprising: a cylinder head in which the first cam shaft is disposed; a cam housing rotatably supporting the first cam shaft on the cylinder head; a cam housing-side boss portion formed in the cam housing, to which an engine-upper side of a body portion of the vacuum pump is fixed; and a cylinder head-side boss portion formed in the cylinder head, to which an engine-lower side of the body portion of the vacuum pump is fixed.

A cover for covering the vacuum pump to close the cylinder head and the cam housing may be detachably attached to the cylinder head and the cam housing.

In addition, a second cam shaft may be disposed in the cylinder head, a timing gear configured to transmit rotation of a crankshaft of the engine may be attached to an axial end portion of one of the first and second cam shafts, and a pump shaft of the vacuum pump may be connected to an axial end portion of another of the first and second cam shafts at the same side as the timing gear attached to the axial end portion of the one of the first and second cam shafts.

According to the aspect of the embodiments of the present invention, the engine-upper side of the body portion of the vacuum pump is fixed to the cam housing-side boss portion which is formed in the cam housing, and the engine-lower side of the body portion of the vacuum pump is fixed to the cylinder head-side boss portion which is formed in the cylinder head. Consequently, since the body portion of the vacuum pump is fixed to both the cam housing and the cylinder head in a bridge manner, floating of the cam housing due to the force applied from the cam shaft can be suppressed with the body portion of the vacuum pump, thereby reliably securing the cam housing. As a result, it is possible to suppress vibration and noise of the engine caused by the cam housing or the cam shaft.

Further, when the cover for covering the vacuum pump to close the cylinder head and the cam housing is detachably attached to the cylinder head and the cam housing, it is possible to block the noise generated at the time of operating the vacuum pump.

In addition, when the timing gear for transmitting the rotation of the crankshaft is attached to the axial end portion of one of the two cam shafts, and the pump shaft of the vacuum pump is connected to the axial end portion of another of the two cam shafts at the same side as the timing gear attached, the body portion of the vacuum pump can be fixed to both the cylinder head and the cam housing within the cover in the bridge manner, while avoiding interference of the timing gear or the timing chain. Therefore, it is possible to save a space, while suppressing the vibration and noise of the engine.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
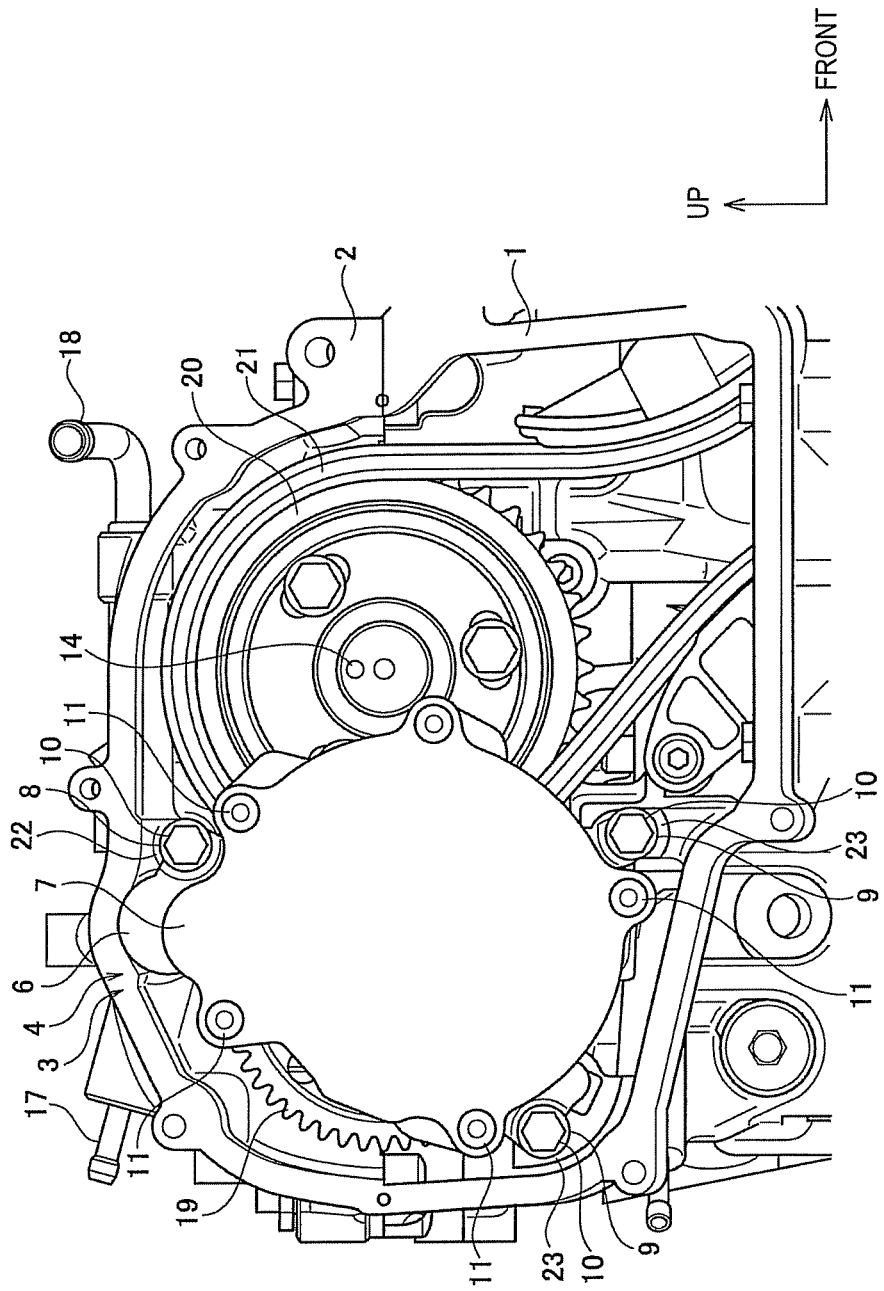
FIG. 1 is a front view of an engine according to an embodiment of a vacuum pump mounting structure of the present invention, where a cover is detached.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
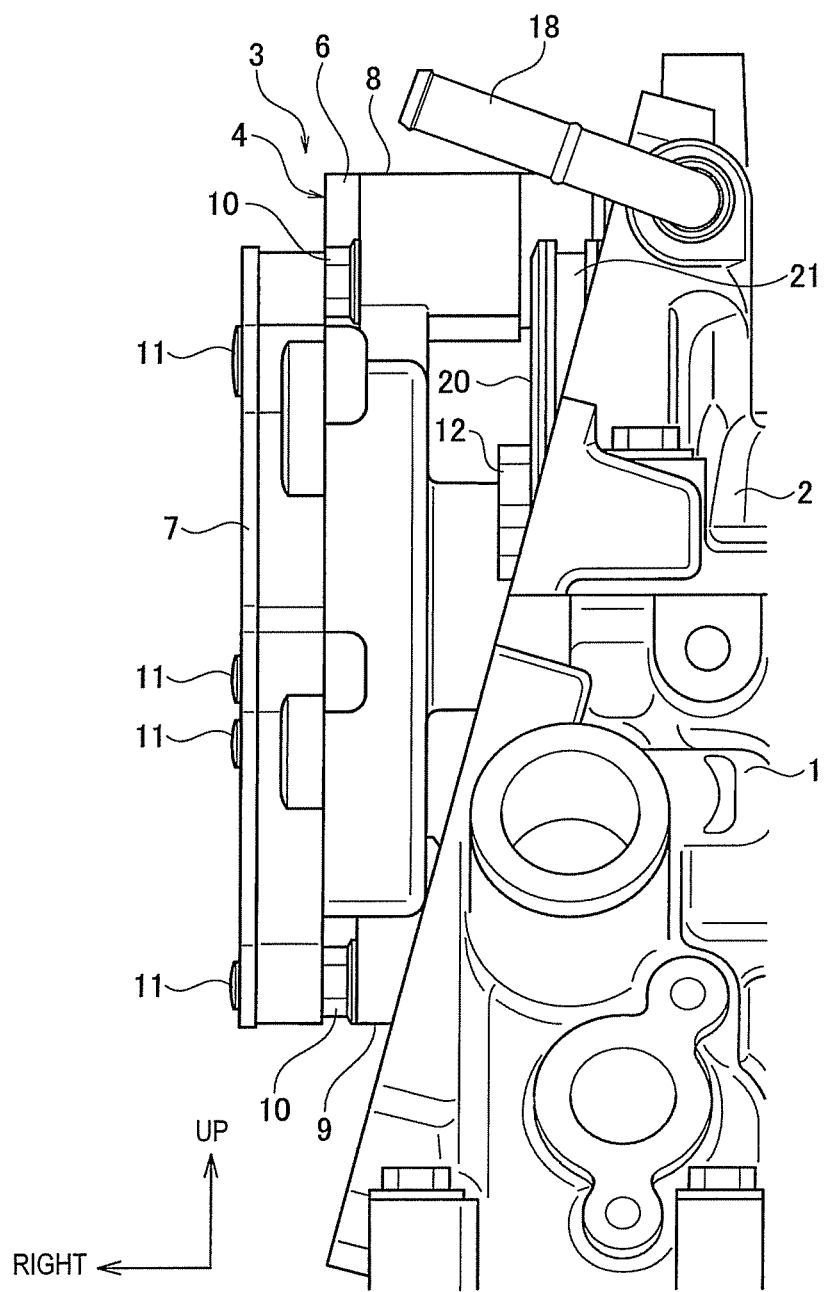
FIG. 2 is a side view of the engine illustrated in FIG. 1.
Figure 3:
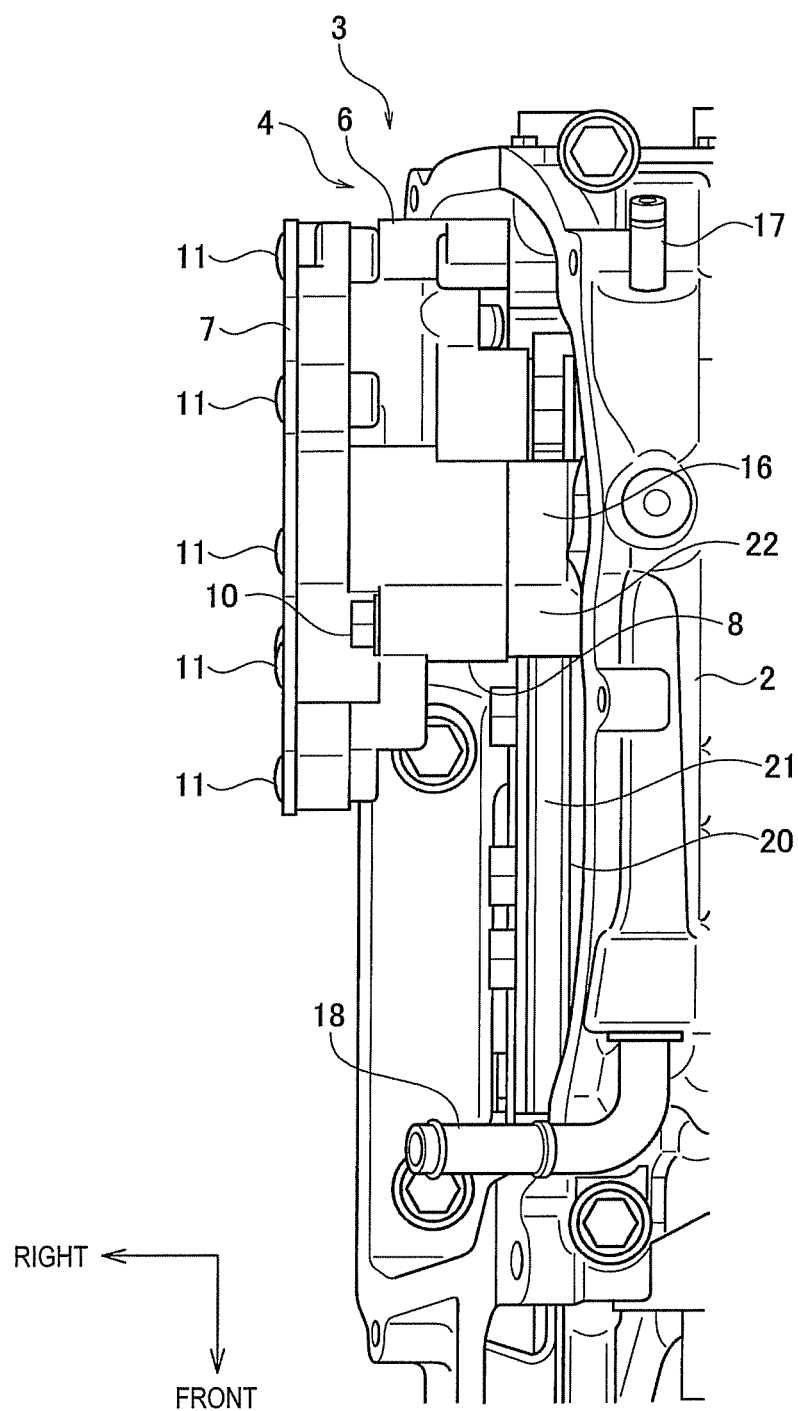
FIG. 3 is a plan view of the engine illustrated in FIG. 1.
Figure 4:
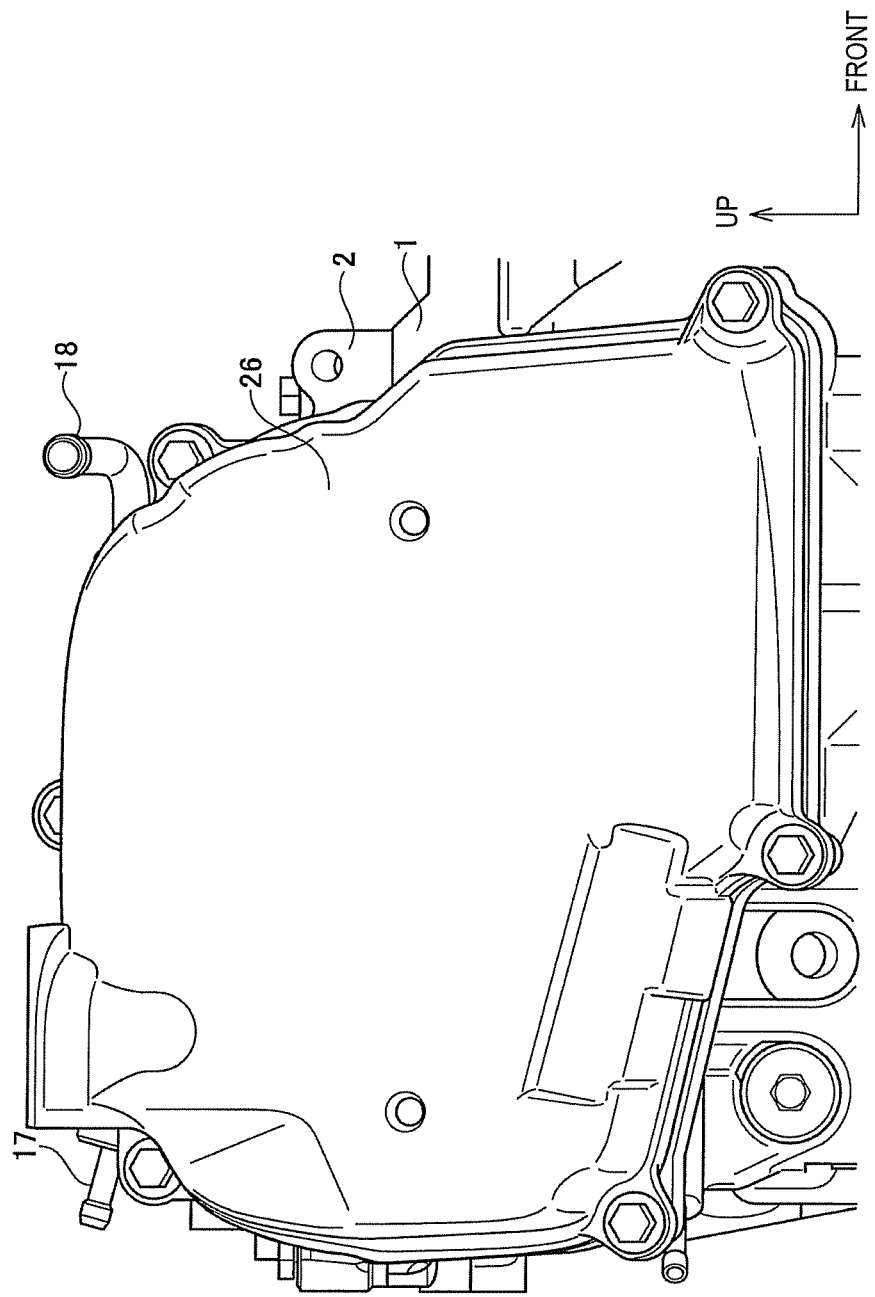
FIG. 4 is a front view of the engine illustrated in FIG. 1, where the cover is attached.
Figure 5:
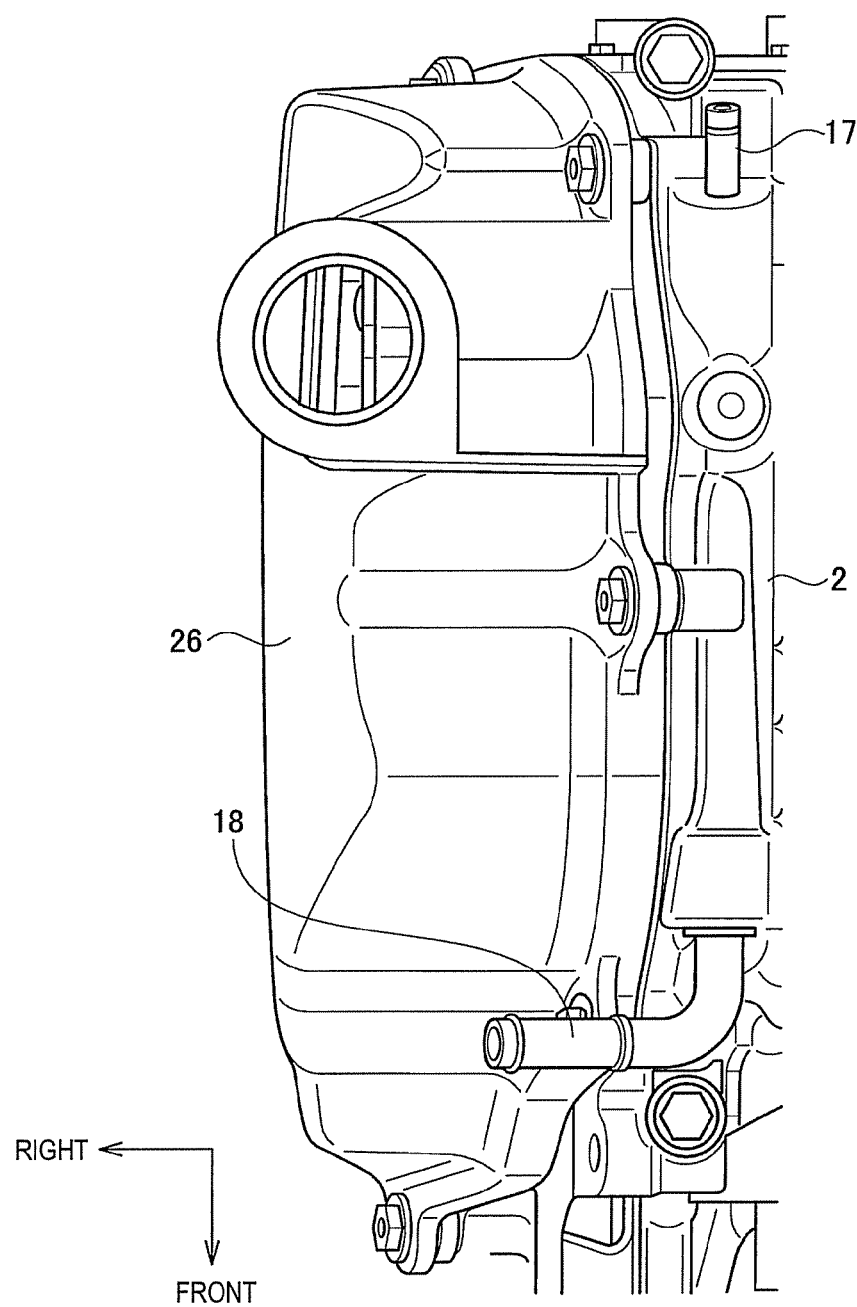
FIG. 5 is a plan view of the engine illustrated in FIG. 4.
Figure 6:
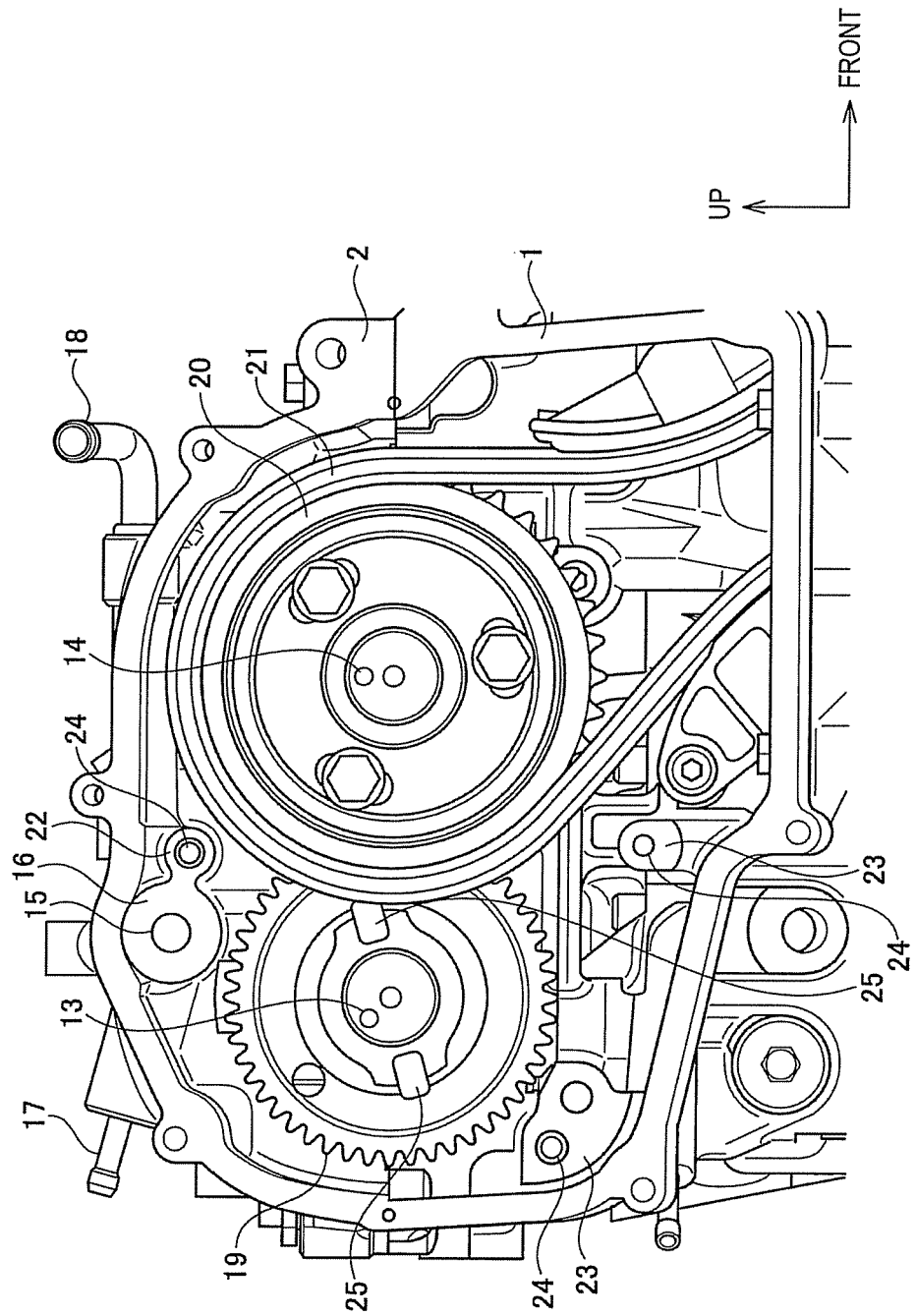
FIG. 6 is a front view of the engine, where a vacuum pump is detached from the state illustrated in FIG. 1.
Figure 7:
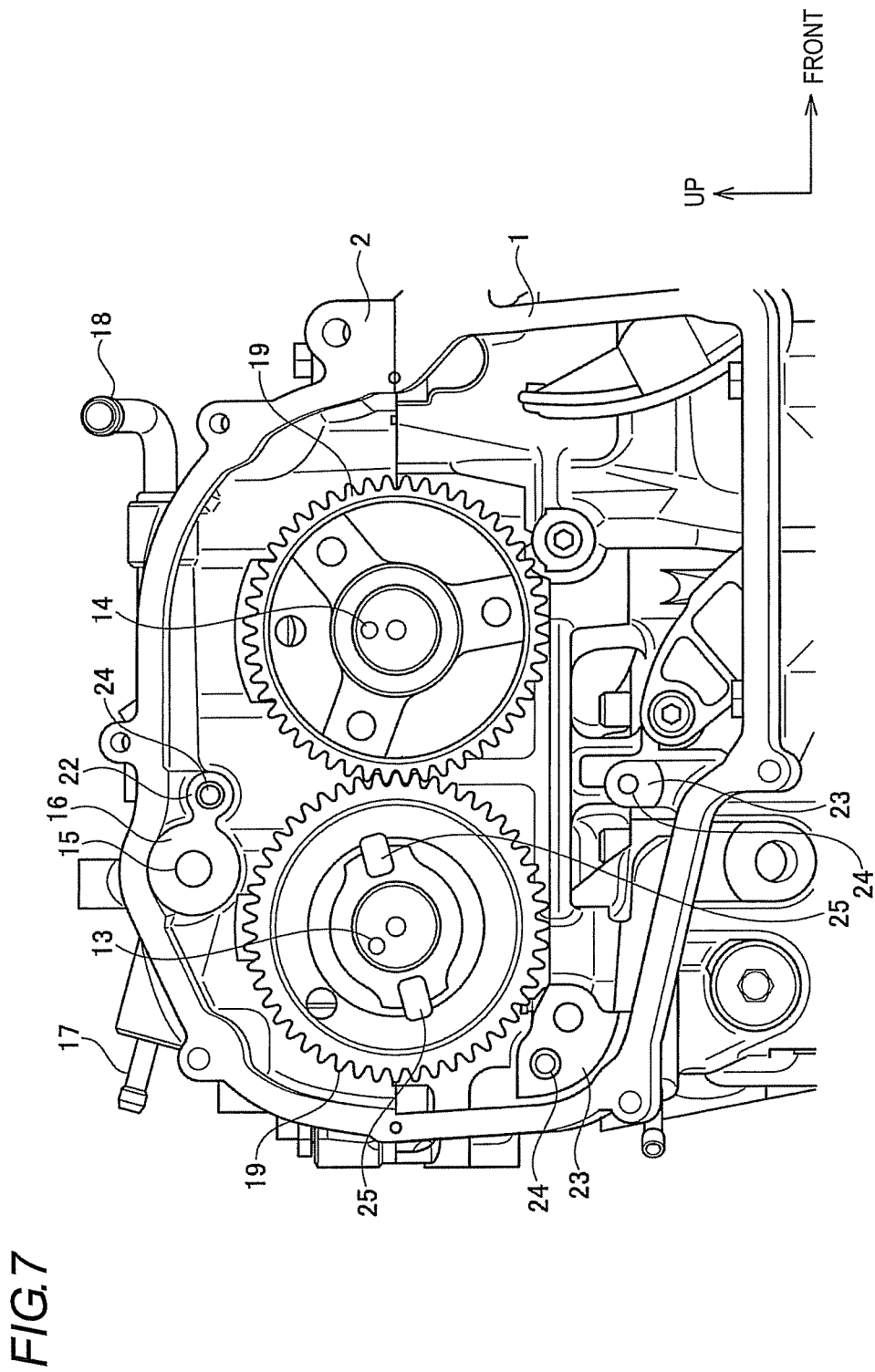
FIG. 7 is a front view of the engine, where a timing gear is detached from the state illustrated in FIG. 6.
Figure 8:
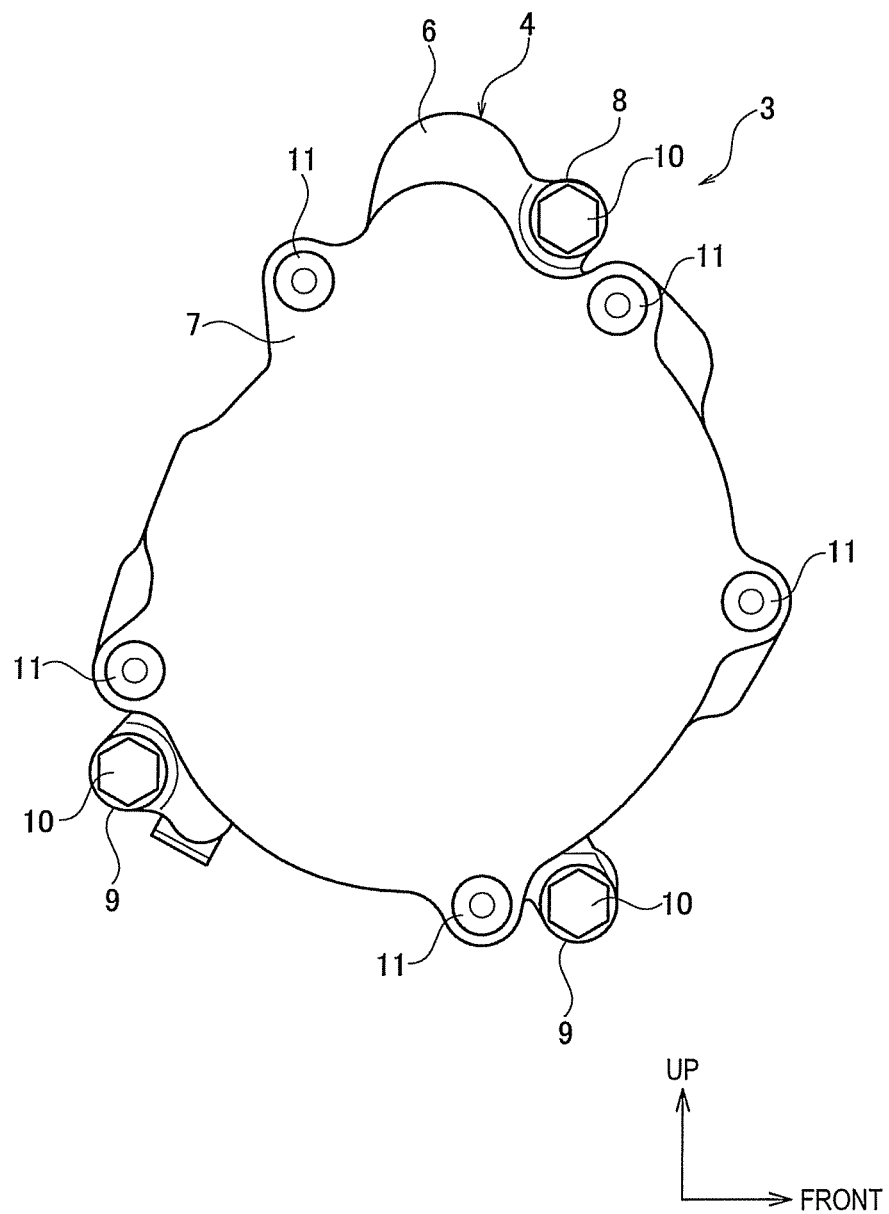
FIG. 8 is a front view of the vacuum pump illustrated in FIG. 1.
Figure 9:
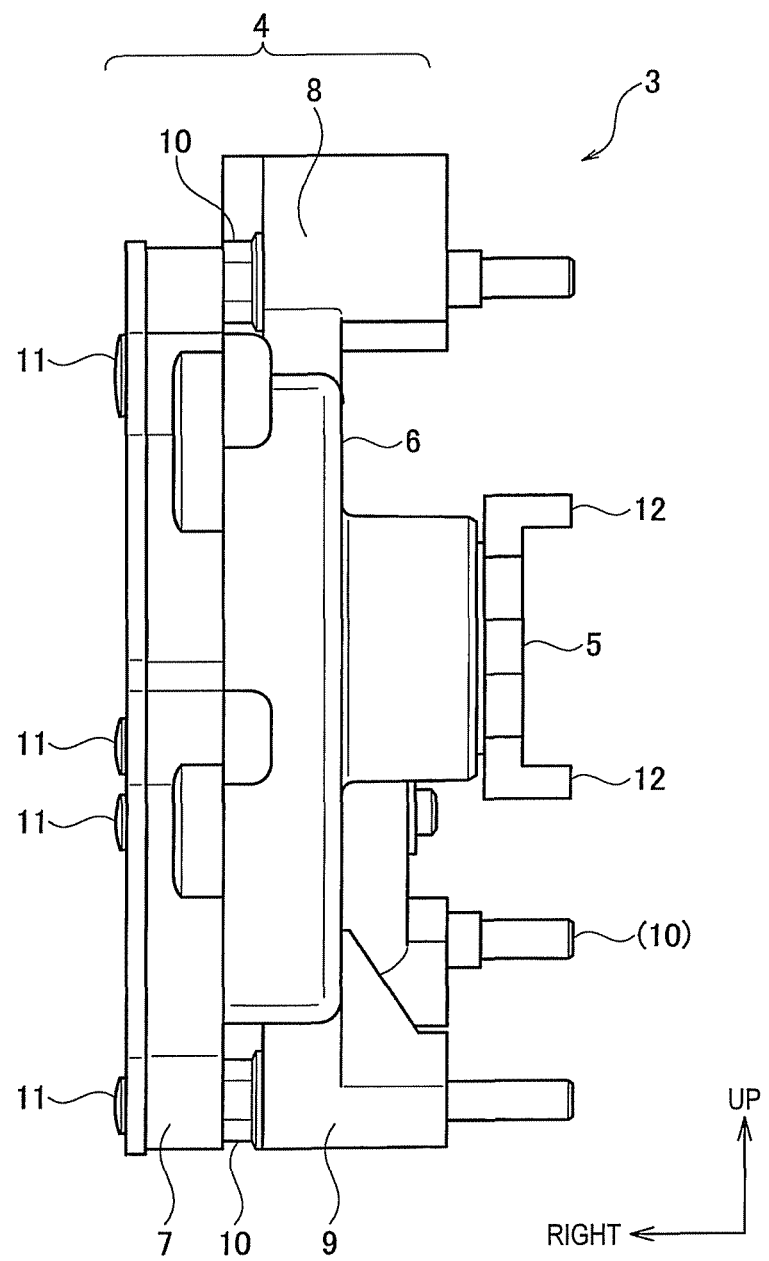
FIG. 9 is a side view of the vacuum pump illustrated in FIG. 8.
Figure 10:
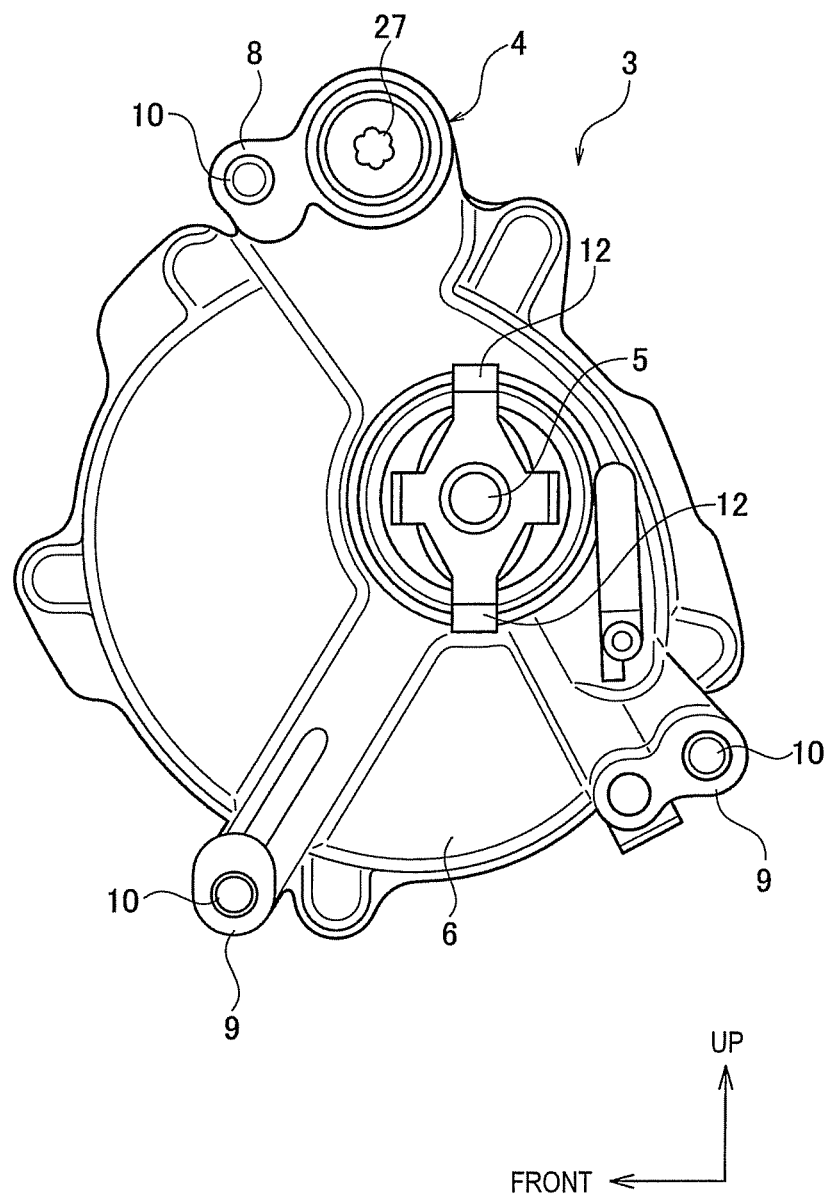
FIG. 10 is a rear view of the vacuum pump illustrated in FIG. 8.

An embodiment of a vacuum pump mounting structure of the present invention will be described with reference to the accompanying drawings. FIG. 1 is a front view of an engine according to an embodiment of a vacuum pump mounting structure of the present invention, where a cover is detached. FIG. 2 is a side view of the engine illustrated in FIG. 1. FIG. 3 is a plan view of the engine illustrated in FIG. 1. FIG. 4 is a front view of the engine illustrated in FIG. 1, where the cover is attached. FIG. 5 is a plan view of the engine illustrated in FIG. 4. FIG. 6 is a front view of the engine, where a vacuum pump is detached from the state illustrated in FIG. 1. FIG. 7 is a front view of the engine, where a timing gear is detached from the state illustrated in FIG. 6. FIG. 8 is a front view of the vacuum pump illustrated in FIG. 1. FIG. 9 is a side view of the vacuum pump illustrated in FIG. 8. FIG. 10 is a rear view of the vacuum pump illustrated in FIG. 8. The engine according to the embodiment includes a cylinder head 1 attached to a cylinder block (not illustrated) from above, and a cam housing 2 attached to the cylinder head 1 from above. An engine body may be mounted to a vehicle in various directions, but since the engine is typically mounted so that the cylinder head 1 is disposed above the cylinder block, the direction in which the cylinder head 1 is disposed relative to the cylinder block is defined as an engine-upper side, while an opposite direction is defined as an engine-lower side.

First, a vacuum pump 3 employed in this embodiment will be described. The vacuum pump 3 according to the embodiment includes a body portion 4 for housing a rotor such as a vane, and a pump shaft 5 connected to the rotor in the body portion 4 and protruding outward from the body portion 4. The body portion 4 has a housing 6 for housing the rotor therein, and a cover 7 for closing the housing 6 in which the rotor is housed. The cover 7 is detachably mounted to the housing 6 with fastening members 11 such as bolts. The housing 6 is provided with one pump-upper-side boss portion 8 for fixing the engine-upper side of the vacuum pump 3 to the engine, and two pump-lower-side boss portions 9 for fixing the engine-lower side of the vacuum pump 3 to the engine. Bolts 10 are inserted into the pump-upper-side boss portion 8 and the pump-lower-side boss portions 9, respectively, and thus the vacuum pump 3 is fixed to the engine with the bolts 10. The pump shaft 5 protrudes from the housing 6 of the body portion 4 in the same protruding direction as the bolts 10, and a protruding end portion of the pump shaft 5 is provided with an engaging claw 12 having two-pronged hook shape. A suction hole 27 is formed in a side face of the housing 6 of the vacuum pump 3 at a side of the pump shaft 5.

Two cam shafts 13 and 14 are disposed in one cylinder head 1. The cam shaft 13 disposed at the left in FIG. 7 is an exhaust cam shaft, while the cam shaft 14 disposed at the right in FIG. 7 is an intake cam shaft. The cam shafts 13 and 14 are attached to the cylinder head 1 by attaching the cam housing 2 to the engine from above, and the cam shafts 13 and 14 are supported so as to be rotatable with respect to the cylinder head 1. When the cam housing 2 is attached to the cylinder head 1, the cam shafts 13 and 14 are pushed toward the cylinder head 1 with the cam housing 2 against a reaction force of, for example, a lash adjuster. The cam housing 2 is provided with a suction flange 16 at a side of the axial end portions of the cam shafts 13 and 14 illustrated in FIGS. 6 and 7, and a center portion of the suction flange 16 is formed with a suction port 15. The suction port 15 is communicated with, for example, a first negative pressure output port 17 which is connected to a VSV for controlling the turbo charger, and a second negative pressure output port 18 which is connected to a negative pressure booster device of the brake.

Gears 19 are attached to one axial end portions of two cam shafts 13 and 14, for example, the axial end portions at the side visible in FIG. 7. The gears 19 are engaged with each other, and have the same number of teeth. Accordingly, two cam shafts 13 and 14 are rotated in opposite directions at the same speed. In the embodiment, a timing gear 20 is attached to the intake cam shaft 14, while no timing gear is attached to the exhaust cam shaft 13. A timing chain 21 for transmitting rotation of the crankshaft is wound around the timing gear 20. With such a configuration, the two cam shafts 13 and 14 are rotated in opposite directions with respect to each other at a rotational speed as much as ½ of the rotational speed of the crankshaft in synchronization with the rotation of the crankshaft.

Further, one cam housing-side boss portion 22 is formed at the engine-upper side of the gear 19 of the exhaust cam shaft 13 to which the timing gear 20 is not attached so as to be adjacent to the suction flange 16, and the cam housing-side boss portion 22 is formed with one screw hole 24. Two cylinder head-side boss portions 23 are formed at the engine-lower side of the gear 19 of the exhaust cam shaft 13, and each of the cylinder head-side boss portions 23 is formed with one screw hole 24. The one screw hole 24 of the cam housing-side boss portion 22 corresponds to the pump-upper-side boss portion 8 formed in the body portion 4 of the vacuum pump 3, and the two screw holes 24 of the cylinder head-side boss portion 23 corresponds to the pump-lower-side boss portion 9. The axial end portion of the exhaust cam shaft 13 at the side at which the gear 19 is attached, is formed with an engaging groove 25 into which the engaging claw 12 of the vacuum pump 3 is fitted.

The engaging claw 12 of the vacuum pump 3 is fitted into the engaging groove 25, the pump-upper-side boss portion 8 abuts against the cam housing-side boss portion 22, and the pump-lower-side boss portions 9 abut against the cylinder head-side boss portions 23. In this state, the bolt 10 inserted into the pump-upper-side boss portion 8 is screwed to the screw hole 24 of the cam housing-side boss portion 22, and the bolts 10 inserted into the pump-lower-side boss portions 9 are screwed to the screw holes 24 of the cylinder head-side boss portions 23. As the bolts 10 are respectively screwed to the screw hole 24 of the cam housing-side boss portion 22, and the screw holes 24 of the cylinder head-side boss portions 23, the vacuum pump 3 is fixed to the cam housing 2 and the cylinder head 1. Therefore, the pump shaft 5 of the vacuum pump 3 is connected to the axial end portion of the exhaust cam shaft 13, and the cylinder 1 is connected to the cam housing 2 with the body portion 4 of the vacuum pump 3. Consequently, the floating of the cam housing 2 due to the force applied from the exhaust cam shaft 13 can be suppressed by the body portion 4 of the vacuum pump 3, thereby reliably securing the cam housing 2. As the vacuum pump 3 is attached to the cylinder head 1 and the cam housing 2, the suction hole 27 of the vacuum pump 3 is connected to the suction port 15 of the cam housing 2 to suck the gas of the first negative pressure output port 17 and the second negative pressure output port 18.

The cover 26 is attached to end faces of the cam housing 2 and the cylinder head 1, to which the vacuum pump 3 is attached. As the cover 26 is attached to the end faces of the cam housing 2 and the cylinder head 1 to cover the vacuum pump 3, the vacuum pump 3 is covered and the end face of the cam housing 2 and the end face of the cylinder head 1 are sealed. Noise generated during operation of the vacuum pump 3 can be blocked by the cover 26.

With the vacuum pump mounting structure according to the embodiment, the pump-upper-side boss portion 8, that is, the engine-upper side of the body portion 4 of the vacuum pump 3 is fixed to the cam housing-side boss portion 22 which is formed in the cam housing 2, and the pump-lower-side boss portion 9, that is, the engine-lower side of the body portion 4 of the vacuum pump 3 is fixed to the cylinder head-side boss portion 23 which is formed in the cylinder head 1. Consequently, since the body portion 4 of the vacuum pump 3 is fixed to both the cam housing 2 and the cylinder head 1 in a bridge manner, the floating of the cam housing 2 due to the force applied from the exhaust cam shaft 13 can be suppressed with the body portion 4 of the vacuum pump 3, thereby reliably securing the cam housing 2. As a result, it is possible to suppress vibration and noise of the engine caused by the cam housing 2 or the exhaust cam shaft 13.

Since the detachable cover 26 for covering the vacuum pump 3 to close the cylinder head 1 and the cam housing 2 is detachably attached to the cylinder head 1 and the cam housing 2, it is possible to block the noise generated at the time of operating the vacuum pump 3.

Since the timing gear 20 for transmitting the rotation of the crankshaft is attached to the axial end portion of the intake cam shaft 14, and the pump shaft 5 of the vacuum pump 3 is connected to the axial end portion of the exhaust cam shaft 13 at the same side as the timing gear 20 attached to the axial end portion of the intake cam shaft 14, the body portion 4 of the vacuum pump 3 can be fixed to both the cylinder head 1 and the cam housing 2 within the cover 26 in the bridge manner, while avoiding the interference of the timing gear 20 or the timing chain 21. Therefore, it is possible to save a space, while suppressing the vibration and noise of the engine.

The present invention is not limited to the embodiment described above. Only one cam shaft may be disposed in the cylinder head. Only one pump-lower-side boss portion may be provided in the housing of the body portion of the vacuum pump and only one cylinder-head-side boss portion may be formed in the cylinder head.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A vacuum pump mounting structure in which a vacuum pump is connected to an axial end portion of a first cam shaft of an engine and is configured to be driven by the first cam shaft, the vacuum pump mounting structure comprising:
    a cylinder head in which the first cam shaft is disposed;
    a cam housing rotatably supporting the first cam shaft on the cylinder head;
    a cover attached to an end face of the cylinder head and an end face of the cam housing from an opposite side to the cylinder head and the cam housing across the vacuum pump in a direction along the first cam shaft;
    a cam housing-side boss portion formed in the cam housing and in the vicinity of a joint portion between the cam housing and the cover, to which an engine-upper side of a body portion of the vacuum pump is fixed; and
    a cylinder head-side boss portion formed in the cylinder head and in the vicinity of a joint portion between the cylinder head and the cover, to which an engine-lower side of the body portion of the vacuum pump is fixed.

2. The vacuum pump mounting structure according to claim 1,
    wherein a second cam shaft is disposed in the cylinder head,
    wherein a timing gear configured to transmit rotation of a crankshaft of the engine is attached to an axial end portion of the second cam shaft, and
    wherein a pump shaft of the vacuum pump is connected to the axial end portion of the first cam shaft at the same side as the timing gear attached to the axial end portion of the second cam shaft.

* * * * *